US008964419B2

(12) United States Patent
Ryoo et al.

(10) Patent No.: US 8,964,419 B2
(45) Date of Patent: Feb. 24, 2015

(54) ACTIVE VOLTAGE DROOP CONTROL-TYPE PULSE POWER GENERATOR

(71) Applicant: Korea Electrotechnology Research Institute, Changwon-si, Gyeongsangnam-do (KR)

(72) Inventors: Hong Je Ryoo, Changwon-si (KR); Sung Roc Jang, Changwon-si (KR); Geun Hie Rim, Changwon-si (KR); Jong Soo Kim, Changwon-si (KR)

(73) Assignee: Korea Electrotechnology Research Institute, Changwon-Si, Gyeongsangnam-Do (KR)

( * ) Notice: Subject to any disclaimer, the term of this patent is extended or adjusted under 35 U.S.C. 154(b) by 160 days.

(21) Appl. No.: 13/687,383

(22) Filed: Nov. 28, 2012

(65) Prior Publication Data
US 2014/0146571 A1    May 29, 2014

(30) Foreign Application Priority Data
Nov. 26, 2012    (KR) .................. 10-2012-0134291

(51) Int. Cl.
   *H02M 3/335*    (2006.01)
(52) U.S. Cl.
   CPC .................. *H02M 3/335* (2013.01)
   USPC ...................... 363/21.1; 363/21.16
(58) Field of Classification Search
   USPC ..................... 363/17, 21.1, 21.16
   See application file for complete search history.

(56) References Cited

U.S. PATENT DOCUMENTS

| 7,843,087    B2  | 11/2010 | Ryoo et al. |
| 7,986,535    B2* | 7/2011  | Jacobson et al. ............. 363/17 |
| 2007/0274132 A1* | 11/2007 | Ogiwara et al. ......... 365/185.23 |
| 2009/0290384 A1* | 11/2009 | Jungreis ........................ 363/17 |

FOREIGN PATENT DOCUMENTS

| JP | 09028087   | 1/1997 |
| KR | 10-0820171 | 4/2008 |
| KR | 100820171 B1 | 4/2008 |

OTHER PUBLICATIONS

Korean Office Action for application dated Feb. 13, 2014.

* cited by examiner

*Primary Examiner* — Emily P Pham
(74) *Attorney, Agent, or Firm* — Lowe Hauptman & Ham, LLP (57) ABSTRACT

An active voltage drop control-type pulse power generator includes power stages, a power inverter, a power loop, a control inverter, a control loop, and a compensation unit. The power stages include power cells connected in series. Each power cell includes a switch and a capacitor connected in series, a driver for driving the switch, a bypass diode connected to both ends of the switch, and a rectifying diode connected to both ends of the capacitor. The power inverter charges the capacitor via the power loop and the rectifying diode inside each power cell. The control inverter provides a control signal for the switch via the control loop and the driver inside each power cell. The compensation unit is connected to one of the power cells and generates a compensation voltage for compensating for a voltage drop at a load according to a voltage detected in real-time from the power cell.

15 Claims, 9 Drawing Sheets

ACTIVE VOLTAGE DROOP CONTROL-TYPE PULSE POWER GENERATOR

CROSS-REFERENCE TO RELATED APPLICATION

This application claims under 35 U.S.C. §119(a) the benefit of Korean Patent Application No. 10-2012-0134291 filed Nov. 26, 2012, the entire contents of which are incorporated herein by reference.

BACKGROUND (a) Technical Field

The present invention relates to a pulse power generator. More particularly, the present invention relates to a pulse power generator which can minimize a voltage droop generated during the application of a high voltage pulse by additionally including a simple circuit configuration without a significant increase in cost and volume.

(b) Background Art

Generally, a high voltage pulse generating circuit uses apparatuses such as a plasma generator (PSII etc.) or various kinds of test equipment, which require a high voltage as a load. A typical high voltage pulse generating circuit has many limitations in terms of the lifespan of the apparatus, the variation of the pulse width, the increase of the pulse repetition rate, the control of the pulse voltage, and the necessity of the DC high voltage power source.

For example, there have been used various pulse generating circuits utilizing gas discharging switches such as a spark gap and a vacuum tube. However, these methods have limitations in that the lifespan of the apparatus is short and the pulse width is impossible to control. Also, there are limitations in that it is difficult to increase the pulse repetition rate and a DC high voltage power supply circuit is needed.

Also, since a method of using a pulse transformer is difficult to obtain a rapid rise time of a pulse due to the leakage inductance of the transformer, and a reset circuit needs to be added due to the self-saturation of the transformer, the circuit becomes complex, noise occurs and the pulse width is difficult to extend.

In the Marx pulse generator, efforts have been made to use an Insulated Gate Bipolar Transistor (hereinafter, referred to as IGBT) that is a semiconductor switch instead of a spark gap switch.

The IGBT is permanent, and can overcome limitations of a mechanical switch used in a typical Marx pulse generator because it becomes possible to control the pulse repetition rate and the pulse width. However, the IGBT also has operational limitations such as switching driving and uniform voltage distribution, causing the limitations of the product reliability.

Core technology of the pulse generator using the IGBT is to overcome the voltage and current rating of a switch. IGBT has a low voltage and current rating unlike a typical gas discharging switching.

Thus, one IGBT is not used instead of one spark gap switch, but a plurality of IGBTs are connected in series as many as required to endure the voltage rating to be turned on/off. In this case, when IGBTs turn on/off, a voltage unbalance may be easily generated due to a difference of the driving timing, and thus may immediately damage the IGBTs when overpassing the voltage rating.

Also, when IGBTs are driven in series, each switch needs an independent driving power. In this case, the insulation strength of the independent driving power has to become greater at the upper portion of a series switch configuration. Accordingly, an insulation technology of the driving power is known as one of the most difficult technologies in the high voltage driving.

In a related art regarding a technology using IGBT, a method of using the IGBT together with a transformer has been known. However, this method entails serious disadvantages because of using the transformer that there are big limitations on the width of outputted pulse and the pulse rise/fall time. Further, it has other disadvantages that the entire apparatus is extremely large, has a low efficiency of operation, and has a very sophisticated circuit although it can protect the apparatus from arc strike. Both a method of using a Marx pulse generator and a method of using IGBT along with a transformer require the use of a high voltage charger, and in the case of using SCR there is a disadvantage that the entire apparatus becomes too big.

Accordingly, in order to overcome the above limitations, the present applicant and inventor filed a patent application entitled "pulse power generator using semiconductor switch" (Korean Patent No. 0820171 and U.S. Pat. No. 7,843,087). This patent (hereinafter, referred to as prior patent) discloses a pulse power generator, in which the lifespan is significantly improved, and the miniaturization and diverse control of a high voltage pulse finally outputted are enabled.

The pulse power generator of the prior patent includes a plurality of power stages connected in series with one another, each power stage including a plurality of power cells connected in series with one another, wherein each power cell has a semiconductor switch and an energy storage capacitor; a power inverter for supplying power so as to charge the energy storage capacitor; a power loop for allowing a power to be supplied to the respective power cells from the power inverter, the power loop being formed of a high-voltage insulating cable; a control inverter for supplying a control signal so as to generate a gate signal and a gate power of the semiconductor switch; and a control loop for allowing the control signal to be supplied to the respective power cells from the control inverter, the control loop being formed of a high-voltage insulating cable.

Here, the plurality of power stages are all connected in series with one another. Since the power cells inside the respective power stages are all connected in series with one another, all power cells inside the pulse power generator are connected in series with one another.

In this case, the respective power cells constituting the power stages include a semiconductor switch, for example, IGBT and an energy storage capacitor connected in series therewith. Also, the semiconductor switches and the energy storage capacitors of the whole power cell in the respective power stage are connected in series with one another. Thus, the semiconductor switches and the energy storage capacitors of the whole power stage constituting the pulse power generator are all connected in series with one another.

Also, each power cell is configured to include a bypass diode connected to both ends of the semiconductor switch, a rectifying diode connected to both ends of the energy storage capacitor, and a power switch driver (gate driving circuit) receiving a gate power insulated from the control loop of a single turn to apply the gate signal and the driving power for driving the semiconductor switch.

These power cells receive power for charging of the capacitor through the power loop connected from the power inverter, and receive the control signal through the control loop connected from the control inverter.

That is, each power stage includes a transformer constituted by the power loop and the control loop. When the inverter supplies a high voltage AC power through the power loop, the voltage adjusted by the power transformer is provided to each power cell to be charged into the capacitor. The control signal applied from the control inverter through the control loop is applied to the power switch driver to output the gate signal and the driving power.

In addition, in order to compensate for a difference of the charge voltage between the energy storage capacitors, the prior patent allows compensation windings to be insertedly connected between the power transformers of the upper and lower power stages so as to have a subtractive polarity. Thus, unbalance of charge voltage between the energy storage capacitors due to a difference of the leakage inductance between the transformers can be overcome.

On the other hand, in the pulse power generator configured as above, all the energy storage capacitors are charged in parallel, and then are connected in series through the switches. Thus, a high voltage pulse is generated by simultaneously discharging the energy storage capacitors in series.

Figure 1:
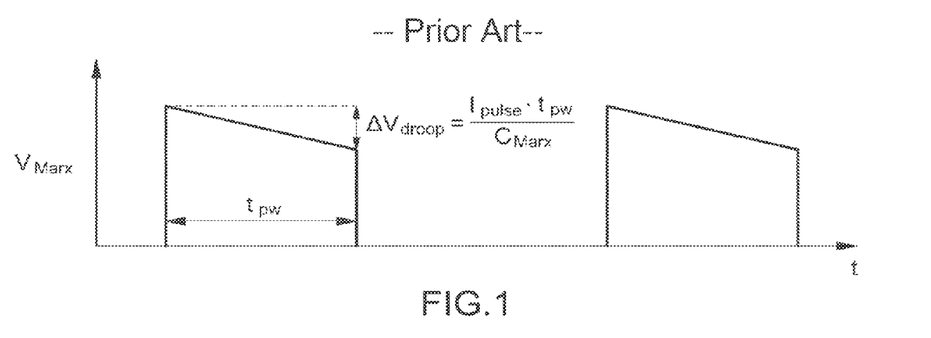
FIG. 1 is a diagram illustrating a voltage droop of a high voltage pulse in a typical pulse power generator.

In this case, while the generated high voltage pulse is being applied to the load, the high voltage pulse outputted to the load, as shown in FIG. 1, shows a voltage droop in which the voltage drops by a certain level every pulse.

The voltage droop occurs because the voltage of the energy storage capacitor gradually drops by the discharging to the load while the pulse is being applied with energy charged in the energy storage capacitor. The voltage droop may not matter according to the application field of the pulse power generator.

However, when the pulse power generator is used as a power generator for an electron accelerator or a pulse power generator for a radar, or is applied to fields of klystron, strict conditions are required.

FIG. 1 is a diagram illustrating a limitation according to a prior art. Here, t denotes time, and $V_{Marx}$ denotes a voltage of a high voltage pulse that is generated in a pulse power generator with a Marx structure and is finally applied to a load.

In this case, the amount of voltage droop (voltage drop) $\Delta V_{droop}$ is related to the capacitance $C_{Marx}$, the pulse current $I_{pulse}$, and the pulse width $t_{pw}$ of the whole energy storage capacitor in the pulse power generator.

As shown in FIG. 1, a voltage droop occurs in every pulse generated while a high voltage pulse is being applied in the pulse power generator. In this case, the application fields of the pulse generator for an electron accelerator or a radar require a low degree of the voltage drop, i.e., the percentage voltage drop within a standard value.

Accordingly, there is a need for a method that can minimize the percentage voltage drop while showing a wide pulse width in a pulse power generator like the prior patent.

Although a method of significantly increasing the capacity of the energy storage capacitor can be considered as a method for reduce the voltage droop, a substantially impossible level of capacitor capacity is required to minimize the voltage droop. Particularly, when the capacity of the capacitor in the high voltage power supply increases, not only cost increases but also volume significantly increases. When the pulse width is lengthened, there is a limitation.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention relates to a pulse power generator which can minimize a voltage droop generated during the application of a high voltage pulse by additionally including a simple circuit configuration without a significant increase in cost and volume.

In one aspect, the present invention provides an active voltage droop control-type pulse power generator including: a plurality of power stages including power cells including a semiconductor switch and an energy storage capacitor connected in series, a power switch driver for driving the semiconductor switch, a bypass diode connected to both ends of the semiconductor switch, and a rectifying diode connected to both ends of the energy storage capacitor, the power cells being connected in series to each other; a power inverter supplying power to charge the energy storage capacitor; a power loop allowing the power to be supplied from the power inverter to the rectifying diode inside each power cell; a control inverter providing a control signal for generating a gate signal and a gate power of the semiconductor switch; and a control loop allowing the control signal to be supplied from the control inverter to the power switch driver inside each power cell, wherein the plurality of power stages are connected in series to each other such that the whole semiconductor switches and energy storage capacitors are connected in series to each other and the pulse power generator further includes a compensation voltage generating unit that includes an output terminal connected to one of the power cells and generates and outputs a compensation voltage for compensating for a voltage drop of an output pulse voltage applied to a load according to a voltage detected in real-time from the power cell through a voltage detection circuit.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 101: PI controller | 102: voltage detection circuit |
| 103: control switch | 104: capacitor |
| 110: power stage | 111: power cell |
| 120: power inverter | 121: power loop |
| 122: power transformer | 130: control inverter |
| 131: control loop | 133: control transformer |
| 134: controller | 135: power controller |
| 136: pulse modulator | 140: compensation voltage generating unit |
| 141: charger | 143: compensation control inverter |
| 148: transformer | 149: rectifying unit |
| 150: bouncer controller | 151: compensation controller |
| 152: pulse modulator | C1, C2: energy storage capacitor |
| $C_{Comp}$: compensation capacitor | S1, S2: semiconductor switch |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The above and other features of the invention are discussed infra.

Hereinafter, exemplary embodiments of the present invention will be described in detail with reference to the accompanying drawings so that those skilled in the art can easily carry out the present invention.

The present invention relates to an active voltage droop control-type pulse power generator, which includes a compensation voltage generating unit that generates a compensation voltage for compensating for a drop of an output pulse voltage to minimize the voltage droop showing during the application of a high voltage pulse.

Figure 2:
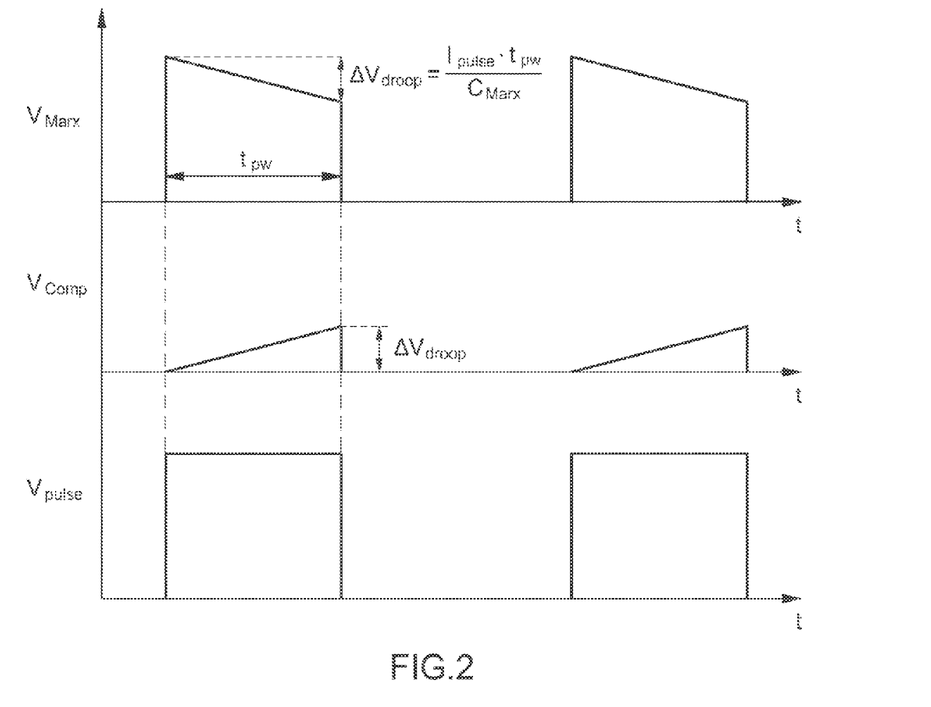
FIG. 2 is a conceptual diagram illustrating a principle of minimizing a voltage droop in a pulse power generator according to an embodiment of the present invention.
Figure 3:
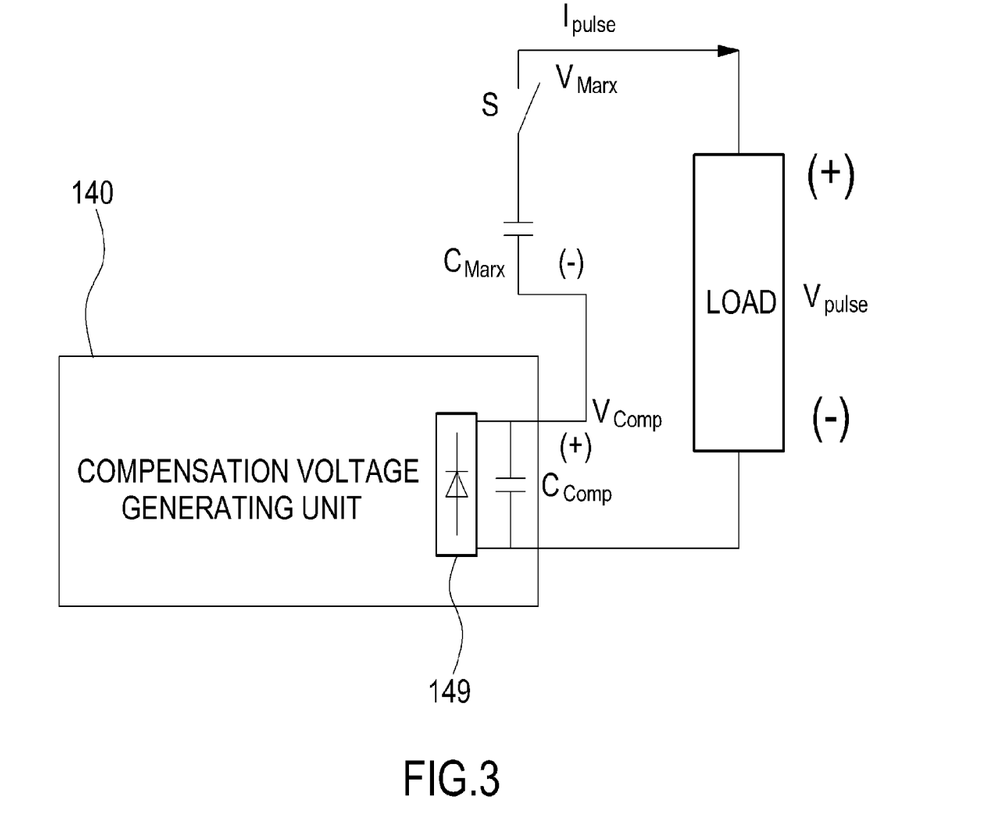
FIG. 3 is a schematic diagram illustrating a compensation voltage generating unit connected in series to an energy storage capacitor of a power cell in a pulse power generator according to an embodiment of the present invention.

Hereinafter, the concept of real-time voltage droop control and voltage compensation performed in a pulse power generator according to an embodiment of the present invention will be described below. FIG. 2 is a conceptual diagram illustrating a principle of minimizing a voltage droop in a pulse power generator according to an embodiment of the present invention. FIG. 3 is a schematic diagram illustrating a compensation voltage generating unit connected in series to an energy storage capacitor of a power cell in a pulse power generator according to an embodiment of the present invention.

In FIG. 2, t denotes time, and $V_{Marx}$ denotes an output pulse voltage at which a voltage droop is generated in a pulse power generator with a Marx structure.

Also, $V_{pulse}$ of FIGS. 2 and 3, which is a result of voltage droop control, denotes a final output pulse voltage compensating for a drop of the output pulse voltage $V_{Marx}$ by applying a compensation voltage $V_{Comp}$.

In brief, $V_{Marx}$ is an output pulse voltage at which the voltage droop is generated due to discharging into a load, and $V_{pulse}$ is an output pulse voltage at which the voltage compensation and the droop control are performed according to an embodiment of the present invention.

In FIG. 3, the capacitor $C_{Marx}$ denotes the whole energy storage capacitor of the pulse power generator, and the switch SW represents semiconductor switches of each power cell simultaneously turned on at a time point of applying a high voltage pulse with respect to $C_{Marx}$ as one switch.

Actually, in the pulse power generator according to this embodiment, a plurality of power stages may be connected in series to each other like the prior patent (Korean Patent No. 0820171 and U.S. Pat. No. 7,843,087). In this case, one power stage may include a plurality of power cell connected in series, and energy storage capacitors and semiconductor switches of the whole power cells and power stages may be connected in series.

In this configuration, the output terminal of a compensation voltage generating unit 140 outputting a compensation voltage $V_{Comp}$ to minimize the voltage droop is connected in series to an energy storage capacitor $C_{Marx}$ of the pulse power generator.

In FIG. 3, the compensation voltage generating unit 140 may include a rectifying unit 149 for rectifying an AC voltage into a DC voltage and a compensation capacitor $C_{Comp}$ that is charged by the DC voltage rectified by the rectifying unit 149 and generates the compensation voltage $V_{Comp}$.

As shown in the drawing, the compensation capacitor $C_{Comp}$ may be connected in series to the energy storage capacitor $C_{Marx}$ of the pulse power generator. Preferably, the power cell to which the output terminal of the compensation voltage generating unit 140 is connected may be the first power cell (Power Cell 1) of the whole power cell opposite to the load (see FIG. 4).

That is, the output terminal ((+) terminal of the compensation voltage generating unit) of the compensation voltage generating unit 140 including the compensation capacitor $C_{Comp}$ may be connected to the power cell ((−) terminal of the first power cell) at the lowest voltage part of the whole stage and power cell constituting the pulse power generator.

In this case, the compensation capacitor $C_{Comp}$ of the compensation voltage generating unit 140 may be connected in series to semiconductor switch S1 of the first power cell (Power Cell 1). The compensation voltage $V_{Comp}$ applied upon charging of the compensation capacitor $C_{Comp}$ may be combined with a pulse voltage outputted when the whole energy storage capacitors C1, C2, ... of the pulse power generator are connected in series to each other while a high voltage pulse is being applied, and may be applied to the load.

In this case, the compensation voltage $V_{Comp}$ applied by the charging of the compensation capacitor $C_{Comp}$ may compensate for a voltage drop $\Delta V_{droop}$ of the high voltage pulse applied to the load. Thus, the final high voltage pulse outputted from the pulse power generator may be applied to load in an even voltage $V_{pulse}$ state without a voltage droop.

Hereinafter, the voltage compensation concept for minimizing the voltage droop will be described with reference to FIG. 2. In a typical pulse power generator, while a high voltage pulse is being generated and applied, the energy storage capacitors ($C_{Marx}$ of FIG. 3) connected in series may be discharged, and a voltage droop in which the voltage drops in every pulse may occur as shown in $V_{Marx}$ of FIG. 2.

In this case, the amount of the voltage droop (voltage drop) $\Delta V_{droop}$ may be related to the whole capacitance (capacitance of an equivalent capacitor shown in FIG. 3 is indicated as $C_{Marx}$ in FIG. 2) of the energy storage capacitor, the pulse current $I_{pulse}$, and the pulse width tpw.

In order to minimize the voltage droop, the present invention may compensate in real-time for the droop $\Delta V_{droop}$ of the pulse voltage by applying the compensation voltage $V_{Comp}$ in series to the output pulse voltage $V_{Marx}$ while a high voltage pulse is being applied.

That is, the final output pulse of the pulse power generator may be allowed to be an even high voltage pulse without a voltage droop as shown in $V_{pulse}$ of FIG. 2, by applying the compensation voltage $V_{Comp}$ for compensating for the voltage droop through the output terminal of the compensation voltage generating unit 140 connected to the energy storage capacitor $C_{Marx}$ while the high voltage pulse is being applied.

For example, assuming the pulse power generator generates a high voltage pulse (high voltage pulse by the energy storage capacitor) of about 120 kV with a certain pulse width and the voltage droop reaches a maximum of about 6 kV, a voltage type of synchronized compensation voltage that gradually increases to a maximum of about 6 kV may be applied to compensate in real-time for the droop while each high voltage pulse is being applied.

Thus, the pulse voltage $V_{pulse}$ that is the sum of the pulse voltage $V_{Marx}$ by the energy storage capacitor and the compensation voltage $V_{Comp}$ applied by the compensation voltage generating unit 140 may be applied to the load.

In this case, the time point when the compensation voltage is applied and the time point when the high voltage pulse is applied may be synchronized such that the compensation voltage is applied only when the high voltage pulse is applied. The compensation voltage may be applied in a pulse voltage shape with the same pulse width as the high voltage pulse.

Also, the magnitude of the compensation voltage may be determined from the voltage droop $\Delta V_{droop}$ showing in the high voltage pulse in real-time. The compensation voltage may be generated and applied in a voltage type gradually increasing to the maximum voltage droop showing in the high voltage pulse The whole configuration of the pulse power generator for controlling the active voltage droop having the compensation voltage generating unit will be described as follows.

Figure 4:
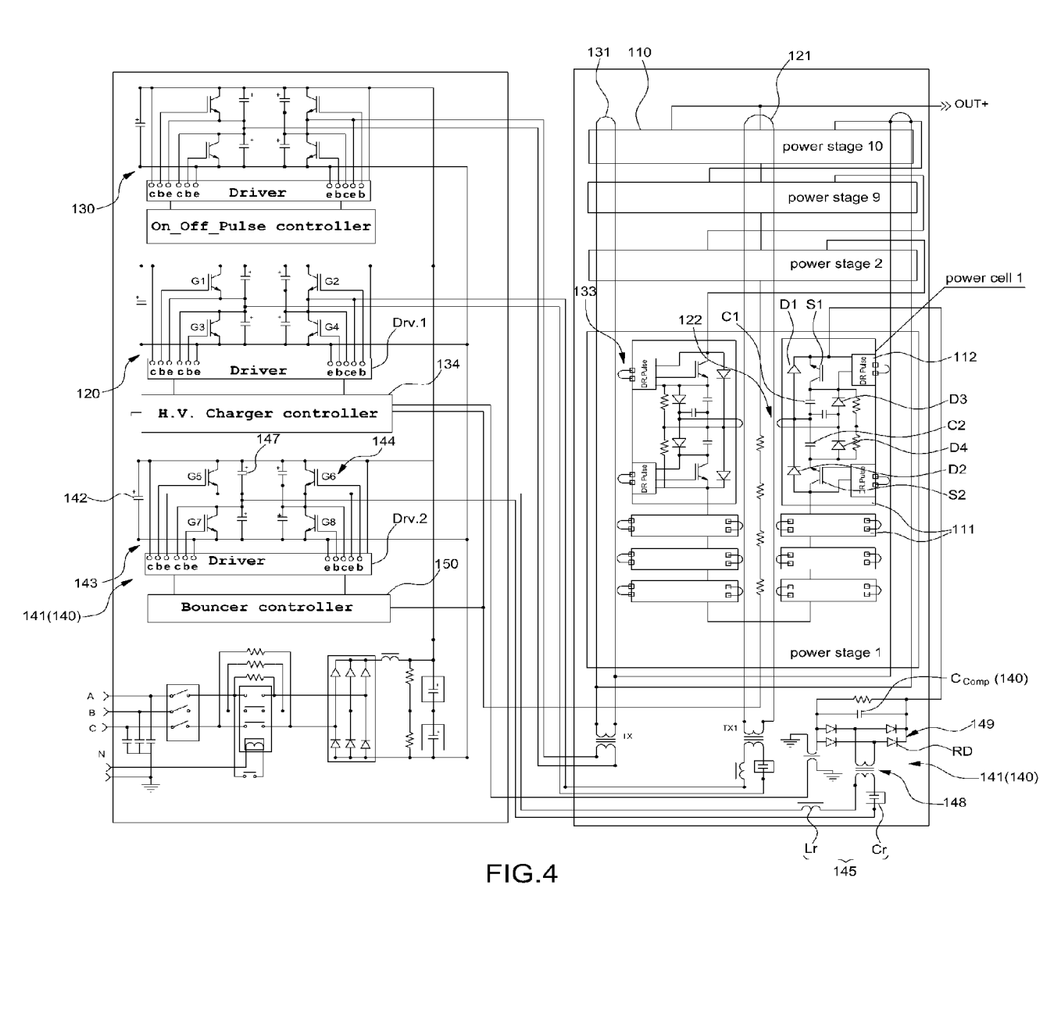
FIG. 4 is a diagram illustrating the whole configuration of a pulse power generator according to an embodiment of the present invention.

FIG. 4 is a diagram illustrating the whole configuration of a pulse power generator according to an embodiment of the present invention. The pulse power generator may include basic components for generating a high voltage pulse. For example, a plurality of power cells 111 may be connected in series to constitute a power stage 110. Energy storage capacitors C1, C2, . . . and semiconductor switches S1, S2, . . . may be connected in series to each other among the power cells 111, which is basically similar to the pulse power generator disclosed in the prior patent (Korean Patent No. 0820171 and U.S. Pat. No. 7,843,087).

The pulse power generator may include a plurality of power stages 110 connected in series with one another, each power stage including a plurality of power cells 111 connected in series with one another; a power inverter 120 for supplying power so as to charge the capacitors C1 and C2 of each power cell; a power loop 121 for allowing a power to be supplied to rectifying diodes D3 and D4 inside each power cell from the power inverter, the power loop being formed of a high-voltage insulating cable; a control inverter 130 for supplying a control signal so as to generate a gate signal and a gate power of semiconductor switches S1 and S2; and a control loop 131 for allowing the control signal to be supplied to a power switch driver 112 inside each power cell from the control inverter, the control loop being formed of a high-voltage insulating cable.

Here, each power cell 111 may include the semiconductor switches S1 and S2 and the energy storage capacitors C1 and C2 connected in series, the power switch driver (gate driving circuit) 112 receiving a gate power insulated from the control loop 131 of a single turn and applying a gate signal and a driving power to drive the semiconductor switches, bypass diodes D1 and D2 connected to both ends of the semiconductor switches, and the rectifying diodes D3 and D4 connected to both ends of the energy storage capacitor.

Also, the plurality of power states 110 may be connected in series to each other. Since the power cells 111 are all connected in series to each other in the power state, the power cells inside the pulse power generator may be all connected in series to each other.

The semiconductor switches S1, S2, . . . and the energy storage capacitors C1, C2, . . . of the whole power cells 111 constituting the pulse power generator may be all connected in series to each other.

In this configuration, the power cells 111 may be supplied with power for charging of the capacitors C1 and C2 through the power loop 121 connected from the power inverter 120, and may be supplied with a control signal through the control loop 131 connected from the control inverter 130.

That is, when the power inverter 120 supplies a high voltage AC power through the power loop 121, the voltage adjusted by a power transformer 122 is provided to each power cell 111 to be charged into the capacitors C1 and C2. The control signal applied from the control inverter 130 through the control loop 131 may be applied to the power switch driver 112 through a control transformer 133 to output the gate signal and the driving power for the driving of the semiconductor switches S1 and S2.

Although not shown, in order to compensate for a charge voltage difference between the energy storage capacitors, compensation windings may be insertedly connected between the power transformers of the upper and lower power stages so as to have a subtractive polarity.

A detailed description of the same configuration as the pulse power generator disclosed in the prior patent will be omitted herein.

A basic method and process of generating a high voltage pulse in the pulse power generator shown in FIG. 4 may be similar to those of the prior patent. Also, since the basic operation and control process for each component, for example, the control and drive of the control inverter, the control and drive of the power inverter, and the control and drive of elements such as semiconductor switches inside the power cell are basically similar to those of the prior patent, a detailed description thereof will be omitted herein.

However, there may be a difference in detailed circuit design for operation implementation or array of circuits or elements. FIG. 4 illustrates an exemplary pulse power generator designed with a voltage doubled rectifier circuit in which each power cell 111 includes two semiconductor switches (e.g., IGBT) S1 and S2 and two energy storage capacitors C1 and C2 connected in series.

In the voltage doubled rectifier circuit, the semiconductor switches S1 and S2 and the energy storage capacitors C1 and C2 may be all connected in series. In each power cell 111, two energy storage capacitors may be simultaneously charged by a voltage provides from one winding (secondary winding) of the power transformer 122, and then two semiconductor switches may be simultaneously turned on while the voltage of two energy storage capacitors are simultaneously discharged.

In the circuit configuration including two energy storage capacitors, since two energy storage capacitors are charged by one winding of the power transformer, a voltage two times greater than the voltage applied through the secondary winding of the power transformer can be charged and discharged in each power cell.

The basic configuration of the power cell including semiconductor switches, energy storage capacitors, power switch driver, bypass diodes, and rectifying diodes may be similar to that of the prior patent. Also, there is no difference in that the high voltage pulse is generated through charging/discharging of the whole energy storage capacitors.

The scope of the present invention should be construed as including the pulse power generator having the power cell configuration of the prior patent as well as the pulse power generator having the power cell configuration of the voltage doubled rectifier circuit described above.

Meanwhile, FIG. 4 illustrates an exemplary compensation generating unit 140 that generates and applies a compensation voltage, and the circuit configuration thereof will be described as follows.

As shown in FIG. 4, the compensation voltage generating unit 140 may be a component that generates and outputs a compensation voltage in real-time to compensate for a voltage corresponding to the voltage drop of a high voltage pulse. Basically, the compensation voltage generating unit 140 may include a compensation capacitor $C_{Comp}$ for allowing the compensation voltage to be applied to an output terminal connected to the power cell 111 while being charged/discharged, and a charger 141 for charging the compensation capacitor.

Here, the charger 141 may include a compensation control inverter 143, a transformer 148, a bridge rectifying unit 149, and a bouncer controller 150. The compensation control inverter 143 may convert a DC voltage supplied from an input power supply 142 into an AC voltage. The transformer 148 may convert the AC voltage outputted from the compensation control inverter 143 into a certain level of voltage. The bridge rectifying unit 149 may rectify the AC voltage delivered from the transformer 148 into a DC voltage to charge the compensation capacitor $C_{Comp}$. The bouncer controller 150 may control the driving of the compensation control inverter 143 to control the output voltage of the inverter.

The input power supply 142 may be a DC power supply, and may supply a DC voltage supplied from an AC power supply and then rectified to the charger 141.

The bouncer controller 150 of the charger 141 may control the driving and the output (compensation voltage) of the compensation voltage generating unit 140, and may control the driving of the compensation control inverter 143 such that a compensation voltage corresponding to a drop of the output pulse voltage can be outputted through charging/discharging of the compensation capacitor $C_{Comp}$.

The bouncer controller 150 of the charger 141 may include a compensation controller (151 of FIGS. 7 and 10) described later and a pulse modulator (152 of FIGS. 7 and 10). A detailed description of the compensation controller and the pulse modulator, and the driving control of the compensation control inverter and the output control of the compensation voltage using the compensation controller and the pulse modulator will be made later.

Also, the compensation control inverter 143 may become a resonant inverter. The resonant inverter may include a switching unit 144, an LC resonance circuit unit 145, and a driver Drv. 2. The switching unit 144 may include a plurality of switches G5 to G8 converting a DC voltage supplied from the input power supply 142 into an AC voltage by alternate switching. The LC resonance circuit unit 145 may be connected to the switching unit 144 and include a resonance inductor Lr and a resonance capacitor Cr to deliver the AC voltage converted by the switching unit 144 to the transformer 148. The driver Drv. 2 may output a gate signal for controlling the switching operation of the switching unit 144 according to a control signal outputted from the bouncer controller 150.

The bouncer charger 150 may be a resonant converter type of high voltage charger that converts a DC voltage supplied from the input power supply into a required level of DC voltage for charging the compensation capacitor.

The switching unit 144 of the compensation control inverter 143 may have a circuit configuration in which four switches G5 to G8 are connected in a full bridge structure. The four switches G5 to G8 may be turned on/off according to the gate signal that is outputted from the driver Drv. 2 to convert a DC voltage into an AC voltage.

The switches G5 to G8 of the switching unit 144 may become well-known semiconductor switches such as IGBT and MOSFET. Reference numeral 147 of the switching unit 144 indicates a snubber capacitor connected to both ends of each switch G5 to G8.

Also, the driver Drv. 2 may generate and output a driving signal (gate signal) for turning on/off the switches G5 to G8 according to the control signal of the bounder controller 150, and thus may allow the switches G5 to G8 to be turned on/off.

In this case, the switching unit 144 may convert a DC voltage into an AC voltage while a pair of switches diagonally disposed is turned on/off according to the driving signal of the driver Drv. 2.

The transformer 148 with a certain turns ratio, having a primary winding connected to the LC resonance circuit unit 145, may convert an AC voltage, i.e., a primary voltage delivered from the LC resonance circuit unit 145 into a secondary voltage and output the secondary voltage. The bridge rectifying unit 149 may rectify the AC voltage applied through the second winding of the transformer 148 into a DC voltage to charge the compensation capacitor $C_{Comp}$.

Thus, while the compensation capacitor $C_{Comp}$ is charged with the voltage, the compensation voltage $V_{Comp}$ as shown in FIG. 2 may be applied to the power cell 111 connected in series to the compensation voltage generating unit 140. In this case, the compensation voltage $V_{Comp}$ that is applied may be in series relation to the output pulse voltage ($V_{Marx}$ of FIG. 2) generated by the whole energy storage capacitors C1, C2, . . . .

The compensation voltage $V_{Comp}$ may be combined with the output pulse voltage $V_{Marx}$ to serve to the droop of the pulse voltage. When the voltage compensation is performed, the high voltage output pulse of the pulse power generator may have an even pulse shape from which the voltage droop is removed to a certain degree as shown in $V_{pulse}$ of FIG. 2.

The compensation voltage generating unit 140 may apply the compensation voltage generated and applied according to the real-time voltage droop (voltage drop), i.e., a pulse type of compensation voltage like $V_{Comp}$ of FIG. 2 in series to the power cell whenever the high voltage pulse of the pulse power generator is applied. For this, the output terminal ((+) terminal) of the compensation voltage generating unit 140 may be connected to a power cell Power Cell 1 at the low voltage part of the pulse power generator.

In the pulse power generator according to this embodiment, when the output terminal of the final power cell connected to the load is a positive (+) terminal, the input terminal of the first power cell Power Cell 1 opposite to the load may become a negative (−) terminal. When this input terminal is connected to the output terminal of the compensation voltage generating unit 140, the capacitor $C_{Comp}$ of the compensation voltage generating unit 140 and the output terminal thereof may be connected in series to the energy storage capacitors C1 and C2 and the semiconductor switches S1 and S2 of the first power cell Power Cell 1.

Thus, the compensation voltage $V_{Comp}$ applied by the compensation voltage generating unit 140 may form a series voltage together with the pulse voltage ($V_{Marx}$ of FIG. 2) generated by the energy storage capacitor $C_{Comp}$.

Meanwhile, the bouncer controller 150 of the charger 141 in the compensation voltage generating unit 140 may control the compensation voltage by controlling an output voltage of the compensation control inverter 143. In this case, the bouncer controller 150 of the charger 141 may control the compensation voltage based on a voltage detected from the power cell 111 of the pulse power generator in real-time.

In this case, the voltage of one energy storage capacitor inside the power cell may be detected, or an actual pulse voltage applied from the output terminal of the final power cell to the load may be detected, and then the output voltage of the compensation voltage generating unit 140, i.e., the compensation voltage may be controlled based on the voltage of the energy storage capacitor or the actual pulse voltage that is detected by the bouncer controller 150.

Figure 5:
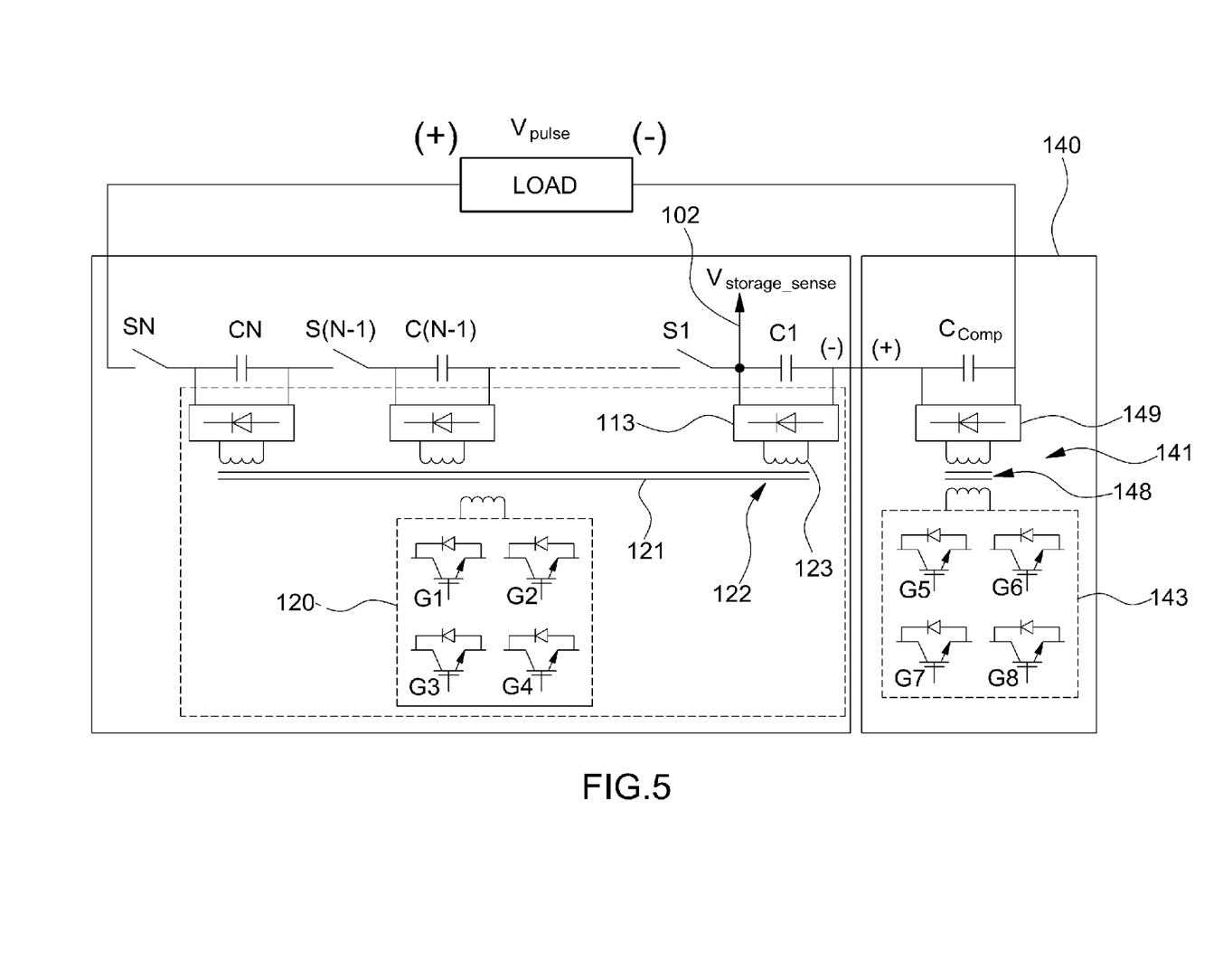
FIG. 5 is a circuit diagram illustrating a configuration for performing high voltage pulse output and droop control by detecting an energy storage capacitor voltage in real-time from a pulse power generator according to an embodiment of the present invention.
Figure 6:
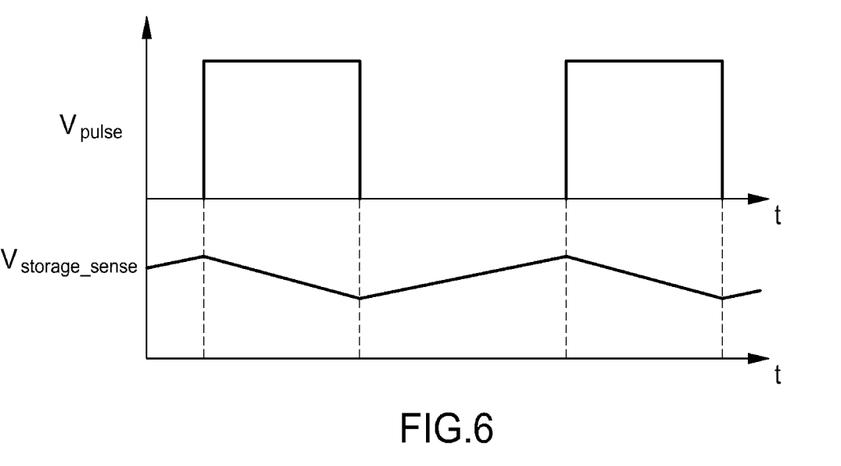
FIG. 6 is a diagram illustrating an output pulse voltage and an energy storage capacitor voltage detected in real-time according to an embodiment of the present invention.

FIG. 5 is a circuit diagram illustrating a configuration for performing high voltage pulse output and droop control by detecting the voltage of one energy storage capacitor in real-time from a pulse power generator according to an embodiment of the present invention. FIG. 6 is a diagram illustrating an output pulse voltage and the voltage of an energy storage capacitor detected in real-time according to an embodiment of the present invention.

FIG. 5 shows semiconductor switches S1, . . . , S(N−1) and SN constituting each power cell, energy storage capacitors C1, . . . , C(N−1) and CN constituting each power cell, a rectifying unit 113 including rectifying diodes (D3 and D4 of FIG. 4), a power transformer 122, a power loop 121, and a secondary winding of the power transformer 122 connected to the rectifying unit 113.

Also, switches G1 to G4 inside the power inverter 120 are shown. The switches G1 to G4 of the power inverter 120 may be turned on/off according to the gate signal outputted from the gate driver (Drv. 1 of FIG. 4). As the switches G1 to G4 are controlled, power (i.e., power for charging the energy storage capacitors) supplied through the power transformer 122 and the voltage of the capacitors C1, . . . , C(N−1) and CN may be controlled.

Also, the compensation capacitor $C_{Comp}$ of the compensation voltage generating unit 140, the switches G5 to G8 of the compensation control inverter 143 constituting the charger 141 of the compensation voltage generating unit 140, the transformer 128, and the rectifying unit 149 are shown in FIG. 5.

The switches G5 to G8 of the compensation control inverter 140 may be turned on/off according to the gate signal outputted by the gate driver (Drv. 2 of FIG. 4). When the switches G5 to G8 are controlled, the output of the compensation voltage may be controlled.

In this configuration, a voltage detection circuit 102 may be configured such that a voltage $V_{storage\_sense}$ can be detected from an energy storage capacitor of the power cell connected in series to the compensation capacitor $C_{Comp}$, preferably, one energy storage capacitor S1 of the power cell, i.e., the first power cell opposite to the load) (Power Cell 1 of FIG. 4) at the low voltage part.

Since the voltage of each energy storage capacitor of the whole power cell can be uniformly maintained by the compensation winding, similarly to the pulse voltage detection method described later, the control of the compensation voltage can be performed on the final high voltage pulse output even when using the voltage detected from one energy storage capacitor.

Hereinafter, a configuration and a process of controlling the generation of the compensation voltage using the voltage $V_{storage\_sense}$ of the energy storage capacitor that is detected in real-time will be described in detail. FIG. 7 is a block diagram illustrating components for controlling a high voltage pulse output and a compensation voltage output using an energy storage capacitor voltage detected in real-time in a pulse power generator according to an embodiment of the present invention Referring to FIG. 7, a main controller 101, a controller 134 for controlling the driving of a power inverter, and a controller 150 for controlling the driving of a compensation voltage generating unit of the pulse power generator are shown.

Figure 7:
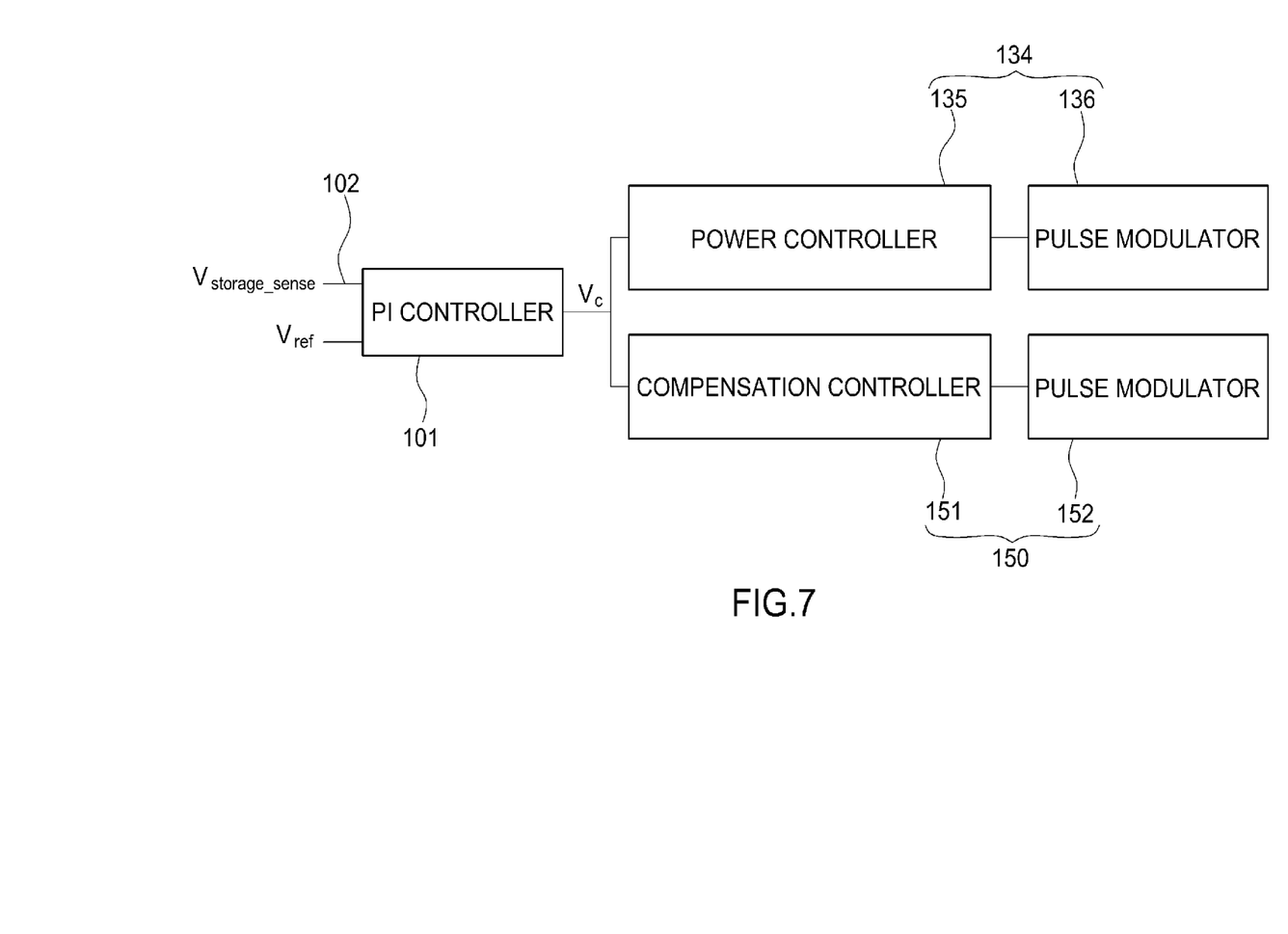
FIG. 7 is a block diagram illustrating components for controlling a high voltage pulse output and a compensation voltage output using an energy storage capacitor voltage detected in real-time in a pulse power generator according to an embodiment of the present invention.

The main controller 101 may be a PI controller as shown in FIG. 7. In this specification, a PI controller will be described as an example of the main controller 101.

The controller 134 for controlling the driving of the power inverter may include a controller 135 for outputting a control signal to control the driving of the power inverter and a pulse modulator 136 connected thereto. Hereinafter, the subordinate controller 135 connected with the pulse modulator 136 will be referred to as a power controller to differentiate the subordinate controller 135 from the superordinate controller 134.

Also, the controller 150 of the charger for controlling the driving of the compensation voltage generating unit may include a controller 151 for outputting a control signal and a pulse modulator 152 connected thereto. Hereinafter, the subordinate controller 151 connected with the pulse modulator 152 will be referred to as a compensation controller to differentiate the subordinate controller 151 from the superordinate controller 150.

First, the PI controller 101 may be configure to receive a reference voltage $V_{ref}$, i.e., a pulse voltage (hereinafter, referred to as a target pulse voltage) that is a target for outputting of a high voltage pulse of the pulse power generator.

Also, during the driving of the pulse power generator, an energy storage capacitor voltage $V_{storage\_sense}$ may be detected in real-time and inputted into the PI controller 101 through the voltage detection circuit 101 connected from the energy storage capacitor of the power cell.

In this case, the PI controller 101 may output a control voltage Vc for allowing the output pulse voltage of the pulse power generator to follow the target pulse voltage $V_{ref}$ based on the voltage $V_{storage\_sense}$ detected from one energy storage capacitor.

In this process, the PI controller 101 may calculate the whole output pulse voltage of the pulse power generator in real-time based on the energy storage capacitor voltage $V_{storage\_sense}$ detected, and may compare the output pulse voltage with the target pulse voltage $V_{ref}$ to generate the control voltage Vc.

The control voltage Vc may be a value related to a difference between the actual pulse voltage and the target pulse voltage $V_{ref}$. When a voltage droop occurs in the actual pulse voltage, the control voltage Vc may become a value in which the voltage drop is reflected.

Next, when the control voltage Vc is inputted into the power controller 135, the power controller 135 may output a signal for controlling the output of the power inverter based on the control voltage. The control signal outputted by the power controller may be applied to the pulse modulator 136 that performs pulse modulation (well-known pulse modulation such as pulse width modulation, frequency modulation, and phase modulation)

The control signal modulated by the pulse modulator 136 may be applied to the gate driver (Drv. 1 of FIG. 4) that generates a gate signal to control the driving of the switches (G1 to G4 of FIG. 5) inside the power inverter. Thus, the gate driver may output the gate signal according to the control signal of the pulse modulator 136.

The driving of the switches inside the power inverter may be controlled by the gate signal outputted from the gate driver, and thus the output of the power inverter, i.e., the charge power of the energy storage capacitor delivered to each power cell through the transformer including the power loop may be controlled. Eventually, the high voltage pulse output of the pulse power generator can be controlled in real-time so as to follow the target pulse voltage.

When the high voltage pulse output is controlled as described above, a voltage droop that the energy storage capacitor voltage gradually drops due to discharging may occur during the application of the high voltage pulse. When the control voltage Vc outputted by the PI controller 101 is inputted into the compensation controller 151 for minimizing the voltage droop, the compensation controller 151 may output a signal to control the compensation voltage according to the control voltage Vc.

In this case, the control signal outputted by the compensation controller 151 may be applied to the pulse modulator 152 that performs the pulse modulation (well-known pulse modulation such as pulse width modulation, frequency modulation, and phase modulation).

Also, the control signal modulated by the pulse modulator 152 may be applied to the gate driver (Drv. 2 of FIG. 4) that generates the gate signal, and the driving of the switches (i.e., switches inside the compensation control inverter) (G5 to G8 of FIG. 5) inside the charger may be controlled by the gate signal outputted from the gate driver according to the control signal. Thus, the generation and output of the compensation voltage may be controlled.

Eventually, the voltage droop of the high voltage pulse can be minimized by applying the compensation voltage generated and controlled according to the energy storage capacitor voltage ($V_{storage\_sense}$ of FIG. 6) detected in real-time in series to the output pulse voltage of the pulse power generator.

Thus, since the energy storage capacitor voltage is used to control the high voltage pulse output of the pulse power generator and simultaneously control the compensation voltage output for minimizing the voltage droop, one control parameter may be used to control both output pulse voltage and compensation voltage.

Figure 8:
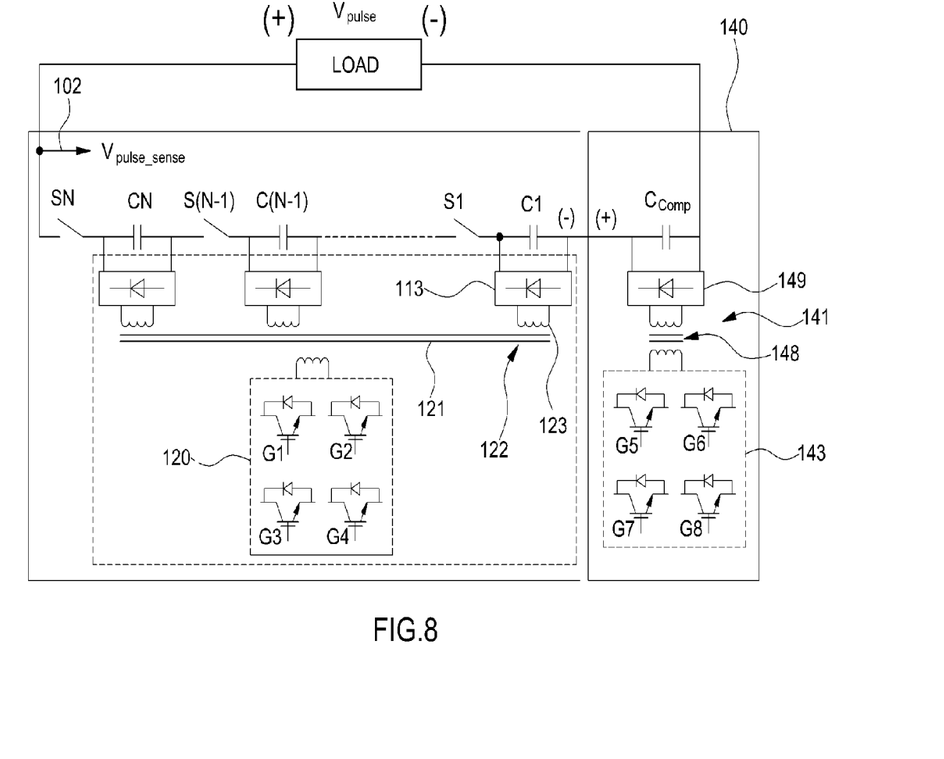
FIG. 8 is a circuit diagram illustrating a configuration for performing high voltage pulse output and voltage droop control by detecting an output pulse voltage in real-time from a pulse power generator according to an embodiment of the present invention.

Hereinafter, an example of detecting the output pulse voltage of the pulse power generator in real-time will be described. FIG. 8 is a circuit diagram illustrating a configuration for performing high voltage pulse output and voltage droop control by detecting an output pulse voltage $V_{pulse\_sense}$ in real-time from a pulse power generator according to an embodiment of the present invention.

Figure 9:
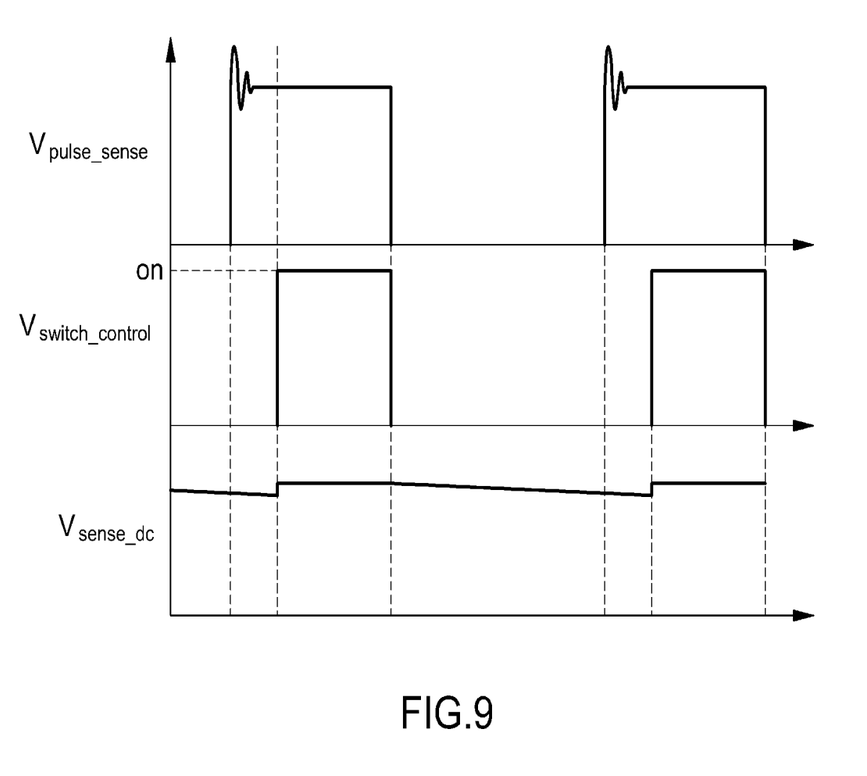
FIG. 9 is a diagram illustrating an output pulse voltage, a control signal of a control switch, and a DC detection voltage according to an embodiment of the present invention.

FIG. 9 is a diagram illustrating an output pulse voltage $V_{pulse\_sense}$, a control signal $V_{switch\_control}$ of a control switch, and a DC detection voltage $V_{sense\_dc}$ converted from the detected output pulse voltage $V_{pulse\_sense}$. FIG. 10 is a block diagram illustrating components for controlling a high voltage pulse output and a compensation voltage output of the pulse power generator As shown in FIG. 8, the real-time pulse voltage $V_{pulse\_sense}$ may be applied to the PI controller 10 through the voltage detection circuit 102 connected from the output terminal (output terminal of the final power cell connected to the load) of the pulse power generator.

In this case, overshoot and oscillation voltage due to the influence of the load may occur in the output pulse voltage $V_{pulse\_sense}$ of the pulse power generator at the time point of the initial pulse rise as shown in FIG. 9, but it is desirable to allow the overshoot and oscillation voltage not to be detected.

Accordingly, the use of input parameter may be allowed to be excluded in the processes of controlling the output pulse through the power inverter control and controlling the voltage droop including the generation of the compensation voltage by allowing the pulse voltage not to be detected by the PI controller from the overshoot and oscillation voltage generation section at the time point of the initial pulse rise.

Figure 10:
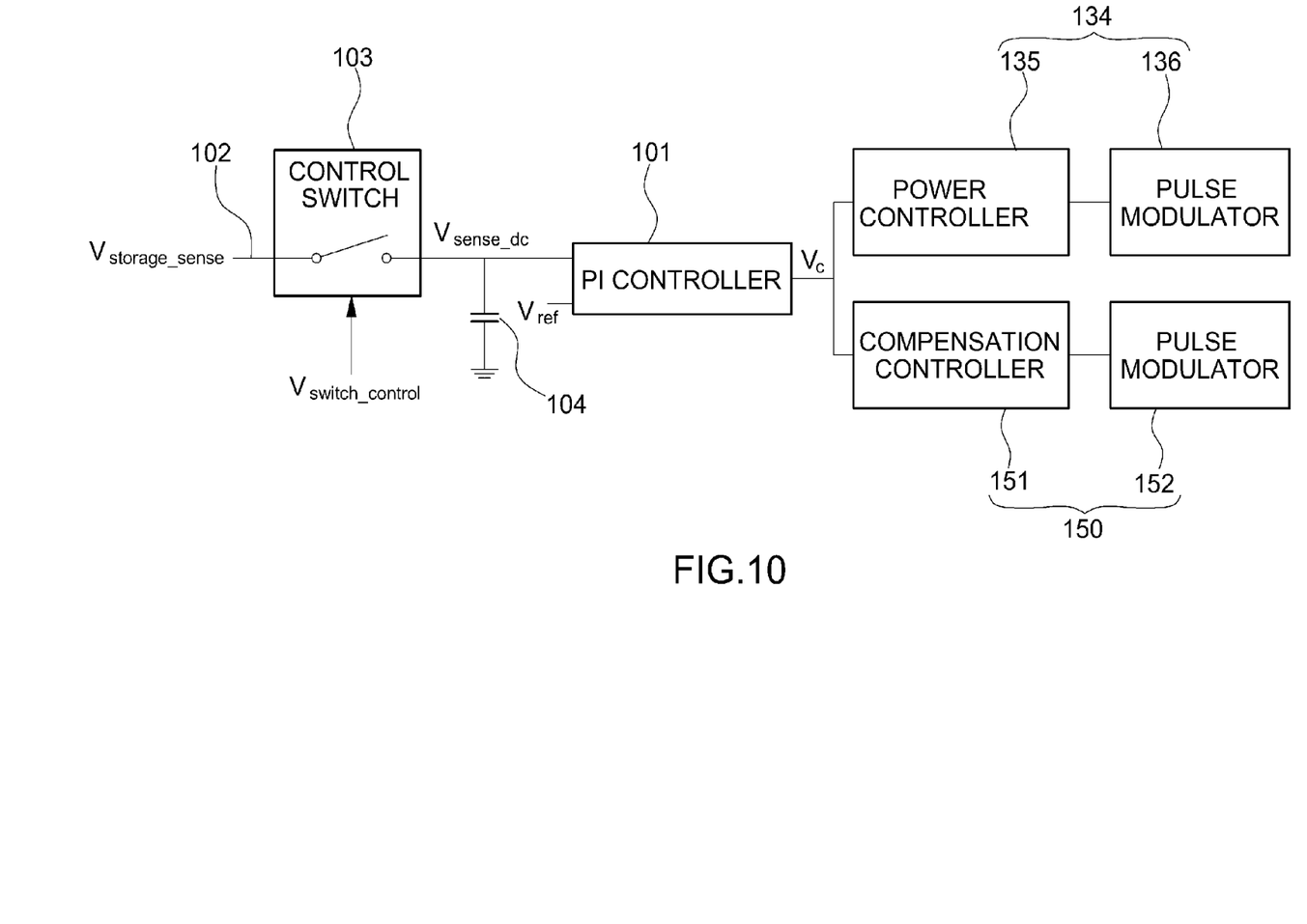
FIG. 10 is a block diagram illustrating components for controlling a high voltage pulse output and a compensation voltage output using an output pulse voltage detected in real-time in a pulse power generator according to an embodiment of the present invention.

For this, a control switch 103 may be disposed on the voltage detection circuit 102 at the front end of the PI controller 101 to which the output pulse voltage is inputted as shown in FIG. 10. The control switch 103 may be allowed to be turned on only at a section other than the overshoot and oscillation voltage generation section of the initial pulse rise among the whole section where the pulse voltage is applied.

In this case, a signal for control the turning on/off of the control switch 103 may be configured to be outputted by a controller inside the pulse power generator, e.g., the PI controller 101.

Referring to FIG. 9, the output pulse voltage $V_{pulse\_sense}$ detected in real-time and the control signal $V_{switch\_control}$ for controlling the turning on/off of the control switch 103 are shown. The output pulse voltage whose overshoot and oscillation voltage is filtered may be allowed to be inputted into the PI controller 101 while the control switch is turned on only at the section other than the overshoot and oscillation voltage generation section of the initial pulse rise by the control signal $V_{switch\_control}$.

In this case, the control signal for turning on the control switch 103 may be configured to be outputted at a predetermined time after the pulse rise (setting time delay). Here, the predetermined time may be appropriately set in consideration of the load characteristics.

Also, a capacitor 104 connected to the ground terminal may be disposed on the voltage detection circuit 102 of the PI controller 101. Thus, the output pulse voltage $V_{pulse\_sense}$ inputted through the control switch 103 may be converted into a DC detection voltage $V_{sense\_dc}$ to be inputted into the PI controller 101 as shown in FIG. 9. When the DC detection voltage $V_{sense\_dc}$ is allowed to be used as an input parameter of the PI controller 101, the control may be facilitated.

Thus, by inputting the pulse voltage (DC detection voltage) $V_{sense\_dc}$ detected in real-time, the high voltage pulse output and the compensation voltage output of the pulse power generator may be controlled by the components of FIG. 10, i.e., the PI controller 101, the power controller 135 and the compensation controller 151, and the pulse modulator 136 and 152 connected to each controller.

Since the process of controlling the high voltage pulse output and the compensation voltage output is similar to that of the embodiment of FIG. 7 except that the PI controller uses the pulse voltage as the input parameter instead of using the energy storage capacitor voltage as the input parameter, a detailed description thereof will be omitted herein.

Thus, an active voltage droop control-type pulse power generator can minimize the voltage droop showing during the application of a high voltage pulse by additionally including a compensation voltage generating unit that applies a compensation voltage for compensating for a drop of an output pulse voltage.

Particularly, the reliability can be improved and the failure possibility can be minimized by adding a simple compensation voltage generating unit with a single compensation circuit type.

Also, compared to a typical pulse formation method for solving the voltage droop, high density, high efficiency, and controllability can be improved. Furthermore, since a real-time compensation method is used instead of an open loop control method, the control performance can be improved.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An active voltage droop control-type pulse power generator comprising:
   a plurality of power stages comprising power cells comprising a semiconductor switch and an energy storage capacitor connected in series, a power switch driver for driving the semiconductor switch, a bypass diode connected to both ends of the semiconductor switch, and a rectifying diode connected to both ends of the energy storage capacitor, the power cells being connected in series to each other;
   a power inverter supplying power to charge the energy storage capacitor;
   a power loop allowing the power to be supplied from the power inverter to the rectifying diode inside each of the power cells;
   a control inverter providing a control signal for generating a gate signal and a gate power of the semiconductor switch; and
   a control loop allowing the control signal to be supplied from the control inverter to the power switch driver inside each of the power cells, wherein the plurality of power stages are connected in series to each other such that all said semiconductor switches and energy storage capacitors are connected in series to each other and the pulse power generator further comprises a compensation voltage generating unit that comprises an output terminal connected to one of the power cells and generates and outputs a compensation voltage for compensating for a voltage drop of an output pulse voltage applied to a load according to a voltage detected in real-time from the power cells through a voltage detection circuit.

2. The active voltage droop control-type pulse power generator of claim 1, wherein the compensation voltage generating unit comprises a compensation capacitor connected so as to allow the compensation voltage to be applied to the output terminal while being charged/discharged, and a charger for charging the energy storage capacitor.

3. The active voltage droop control-type pulse power generator of claim 2, wherein the output terminal of the compensation voltage generating unit is connected to a first power cell of the power cells, the first power cell opposite to the load, and the compensation capacitor is connected in series to the semiconductor switch and the energy storage capacitor of the first power cell such that the compensation voltage is applied in series to the output pulse voltage.

4. The active voltage droop control-type pulse power generator of claim 2, wherein
   the charger comprises:
      a compensation control inverter for converting a DC voltage supplied from an input power supply into an AC voltage;
      a transformer for transforming the AC voltage outputted from the compensation control inverter;
      a bridge rectifier for rectifying the AC voltage delivered from the transformer into a DC voltage to charge the compensation capacitor; and
      a controller for controlling a driving and an output of the compensation control inverter, and
   the controller controls the driving of the compensation control inverter to allow the compensation voltage to be outputted in response to a voltage drop of the output pulse voltage through the charging/discharging of the compensation capacitor.

5. The active voltage droop control-type pulse power generator of claim 4, wherein the compensation control inverter comprises:
   a switching unit comprising a plurality of switches turned on/off to convert a DC voltage into an USAC voltage;
   an LC resonance circuit unit comprising a resonance inductor and a resonance capacitor delivering the AC voltage converted by the switch unit to the transformer; and
   a gate driving circuit unit outputting a gate signal to control the switches of the switching unit according to a control signal outputted from the controller.

6. The active voltage droop control-type pulse power generator of claim 4, wherein
   the controller comprises a compensation controller outputting a control signal according to a control voltage outputted from a main controller and a pulse modulator performing pulse modulation of the control signal outputted from the compensation controller to output a modulated control signal, and
   the main controller outputs the control voltage according to a difference between an actual pulse voltage detected in real-time from the power cells and a predetermined target pulse voltage.

7. The active voltage droop control-type pulse power generator of claim 6, wherein a controller of the power inverter controlling the output pulse voltage by controlling the driving of the power inverter such that the output pulse voltage follows the predetermined target pulse voltage comprises a power controller outputting a control signal according to the control voltage outputted from the main controller and a pulse modulator performing pulse modulation of the control signal outputted from the power controller to output a modulated control signal.

8. The active voltage droop control-type pulse power generator of claim 6, wherein the voltage detected in real-time from the power cells is an energy storage capacitor voltage detected from the energy storage capacitor comprised in a first power cell of the power cells, the first power cell opposite to the load.

9. The active voltage droop control-type pulse power generator of claim 6, wherein the voltage detected in real-time from the power cells is an actual output pulse voltage detected from an output terminal of a final power cell connected to the load.

10. The active voltage droop control-type pulse power generator of claim 9, comprising a control switch disposed at a front end of the main controller receiving the output pulse voltage, wherein the control switch is turned on such that the detected voltage is inputted into the main controller at a predetermined time after a pulse rise of the output pulse voltage.

11. The active voltage droop control-type pulse power generator of claim 9, comprising a capacitor disposed at a front end of the main controller receiving the output pulse voltage to allow a DC detection voltage converted from the output pulse voltage to be inputted into the main controller.

12. The active voltage droop control-type pulse power generator of claim 1, wherein the voltage detected in real-time from the power cells is an energy storage capacitor voltage detected from the energy storage capacitor comprised in a first power cell of the power cells, the first power cell opposite to the load.

13. The active voltage droop control-type pulse power generator of claim 1, wherein the voltage detected in real-time from the power cells is an actual output pulse voltage detected from an output terminal of a final power cell connected to the load.

14. The active voltage droop control-type pulse power generator of claim 7, wherein the voltage detected in real-time from the power cells is an energy storage capacitor voltage detected from the energy storage capacitor comprised in a first power cell of the power cells, the first power cell opposite to the load.

15. The active voltage droop control-type pulse power generator of claim 7, wherein the voltage detected in real-time from the power cells is an actual output pulse voltage detected from an output terminal of a final power cell connected to the load.

* * * * *